US012093414B1

(12) United States Patent
Munoz et al.

(10) Patent No.: US 12,093,414 B1
(45) Date of Patent: Sep. 17, 2024

(54) EFFICIENT DETECTION OF IN-MEMORY DATA ACCESSES AND CONTEXT INFORMATION

(71) Applicant: Amazon Technologies, Inc., Seattle, WA (US)

(72) Inventors: Ricardo Rodriguez Munoz, Renton, WA (US); Karthikeyan Mahadevan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 16/708,157

(22) Filed: Dec. 9, 2019

(51) Int. Cl.
*G06F 21/62* (2013.01)

(52) U.S. Cl.
CPC .................. *G06F 21/6218* (2013.01)

(58) Field of Classification Search
CPC .......................... G06F 21/6227; G06F 21/6245
USPC .......................................................... 726/23
See application file for complete search history.

(56) References Cited

U.S. PATENT DOCUMENTS

| | | | | |
|---|---|---|---|---|
| 4,562,535 A | * | 12/1985 | Vincent | G06F 15/17 710/104 |
| 4,633,392 A | * | 12/1986 | Vincent | G06F 15/161 713/1 |
| 5,940,860 A | * | 8/1999 | Hagersten | G06F 12/0813 709/216 |
| 6,256,620 B1 | | 7/2001 | Jawahar et al. | |
| 6,584,419 B1 | * | 6/2003 | Alexander | G01R 29/027 702/68 |
| 6,735,702 B1 | * | 5/2004 | Yavatkar | H04L 63/1416 726/13 |
| 6,792,460 B2 | * | 9/2004 | Oulu | H04L 67/22 717/124 |
| 7,412,369 B1 | * | 8/2008 | Gupta | G06F 11/3457 703/20 |
| 7,415,704 B2 | * | 8/2008 | Schmidt | G06F 9/544 717/166 |
| 7,457,872 B2 | | 11/2008 | Aton et al. | |
| 7,793,304 B2 | | 9/2010 | Schank et al. | |
| 8,181,036 B1 | * | 5/2012 | Nachenberg | H04L 63/1416 709/224 |
| 8,356,286 B2 | | 1/2013 | Schmelter et al. | |

(Continued)

FOREIGN PATENT DOCUMENTS

| | | | | |
|---|---|---|---|---|
| CN | 105653458 A | * | 6/2016 | |
| CN | 105897728 A | * | 8/2016 | ......... H04L 63/1425 |

(Continued)

OTHER PUBLICATIONS

Guangchun, Luo, Lu Xianliang, Li Jiong, and Zhang Jun. "MADIDS: A novel distributed IDS based on mobile agent." ACM SIGOPS Operating Systems Review 37, No. 1 (2003): 46-53. (Year: 2003).*

(Continued)

*Primary Examiner* — Luu T Pham
*Assistant Examiner* — Walter J Malinowski
(74) *Attorney, Agent, or Firm* — Robert C. Kowert; Kowert, Hood, Munyon, Rankin & Goetzel, P.C.

(57) ABSTRACT

A memory access tracking agent detects an access request directed to an in-memory representation of a target data structure. The agent obtains run-time context information pertaining to the request, including thread stack information. Indications of the occurrence of the access request and the context information are provided to a destination.

20 Claims, 10 Drawing Sheets

(56) References Cited

U.S. PATENT DOCUMENTS

| | | | |
|---|---|---|---|
| 8,478,948 B2 | 7/2013 | Panchenko et al. | |
| 8,621,610 B2* | 12/2013 | Oberheide | H04L 63/145 |
| | | | 713/192 |
| 10,671,726 B1* | 6/2020 | Paithane | H04L 63/1416 |
| 11,126,563 B1* | 9/2021 | Emelyanov | G06F 12/1483 |
| 2001/0051864 A1* | 12/2001 | Kerr | H04L 47/2441 |
| | | | 703/27 |
| 2002/0055941 A1* | 5/2002 | Kolodner | G06F 12/0253 |
| 2003/0196169 A1* | 10/2003 | Wittkotter | G06F 21/606 |
| | | | 715/255 |
| 2004/0237064 A1* | 11/2004 | Liu | G06F 9/547 |
| | | | 717/101 |
| 2005/0039187 A1* | 2/2005 | Avakian | G06F 11/3476 |
| | | | 719/310 |
| 2005/0204342 A1 | 9/2005 | Broussard | |
| 2006/0143350 A1* | 6/2006 | Miloushev | G06F 9/5072 |
| | | | 710/242 |
| 2006/0242104 A1* | 10/2006 | Ellis | G06F 16/289 |
| 2006/0248140 A1* | 11/2006 | Birenheide | G06F 9/44536 |
| | | | 709/208 |
| 2007/0143323 A1* | 6/2007 | Vanrenen | G06F 9/5038 |
| 2008/0133971 A1* | 6/2008 | Zhou | G06F 11/079 |
| | | | 714/E11.026 |
| 2009/0089878 A1* | 4/2009 | Monastyrsky | G06F 21/566 |
| | | | 726/22 |
| 2009/0276774 A1* | 11/2009 | Kinoshita | G06F 21/6218 |
| | | | 718/1 |
| 2009/0328005 A1* | 12/2009 | Miskelly | G06F 11/3636 |
| | | | 717/124 |
| 2010/0031252 A1* | 2/2010 | Horwitz | G06F 11/3466 |
| | | | 718/1 |
| 2010/0100369 A1* | 4/2010 | Shetty | G06F 40/40 |
| | | | 704/4 |
| 2011/0029822 A1 | 2/2011 | Moser | |
| 2011/0219208 A1* | 9/2011 | Asaad | G06F 9/06 |
| | | | 712/12 |
| 2011/0314543 A1* | 12/2011 | Treit | G06F 21/577 |
| | | | 726/23 |
| 2013/0097392 A1* | 4/2013 | Arges | G06F 21/6209 |
| | | | 711/147 |
| 2013/0145463 A1* | 6/2013 | Ghosh | G06F 21/566 |
| | | | 726/22 |
| 2013/0232215 A1* | 9/2013 | Gupta | G06F 3/061 |
| | | | 709/213 |
| 2014/0026121 A1* | 1/2014 | Jackson | G06F 9/44521 |
| | | | 717/124 |
| 2014/0053084 A1* | 2/2014 | Kim | G06Q 10/101 |
| | | | 715/753 |
| 2014/0059527 A1* | 2/2014 | Gagliardi | G06F 8/656 |
| | | | 717/166 |
| 2014/0082596 A1* | 3/2014 | Judelman | G06F 9/449 |
| | | | 717/130 |
| 2014/0201838 A1* | 7/2014 | Varsanyi | H04L 63/1425 |
| | | | 726/23 |
| 2014/0229480 A1* | 8/2014 | Buxbaum | G06F 16/254 |
| | | | 707/736 |
| 2014/0282153 A1* | 9/2014 | Christiansen | G06Q 30/0269 |
| | | | 715/765 |
| 2014/0304824 A1* | 10/2014 | Sirohi | G06F 21/6218 |
| | | | 726/26 |
| 2014/0331317 A1* | 11/2014 | Singh | H04L 63/1425 |
| | | | 726/22 |
| 2015/0081658 A1* | 3/2015 | Meyles | G06F 16/24561 |
| | | | 707/706 |
| 2015/0220421 A1 | 8/2015 | Romer et al. | |
| 2015/0312344 A1* | 10/2015 | Anderton | G06Q 10/06 |
| | | | 709/203 |
| 2015/0324586 A1* | 11/2015 | Ghosh | G06F 21/56 |
| | | | 726/23 |
| 2016/0062691 A1* | 3/2016 | Chang | G11C 11/4072 |
| | | | 713/320 |
| 2016/0103612 A1* | 4/2016 | Christodorescu | G06F 3/0653 |
| | | | 711/117 |
| 2016/0212159 A1* | 7/2016 | Gupta | H04L 63/1416 |
| 2016/0253497 A1* | 9/2016 | Christodorescu | G06F 21/554 |
| | | | 726/23 |
| 2016/0352834 A1* | 12/2016 | Borowiec | G06F 3/0634 |
| 2017/0034193 A1* | 2/2017 | Schulman | H04L 63/1416 |
| 2017/0126812 A1* | 5/2017 | Singhal | H04L 67/01 |
| 2017/0161653 A1* | 6/2017 | Visvanathan | G06Q 10/067 |
| 2017/0185333 A1* | 6/2017 | Gauda | G06F 21/00 |
| 2017/0200011 A1* | 7/2017 | Lin | G06F 21/577 |
| 2017/0300775 A1* | 10/2017 | Paschalakis | G06V 10/42 |
| 2017/0308713 A1* | 10/2017 | Nagaratnam | H04L 9/0897 |
| 2017/0337085 A1* | 11/2017 | Chan | G06F 9/5044 |
| 2017/0371733 A1* | 12/2017 | Rugina | G06F 3/0622 |
| 2018/0004869 A1* | 1/2018 | Asahara | G06N 7/01 |
| 2018/0212928 A1* | 7/2018 | Gerber | H04L 63/1425 |
| 2018/0234462 A1* | 8/2018 | Kruse | H04L 63/10 |
| 2019/0042429 A1* | 2/2019 | Kumar | G06F 12/0831 |
| 2019/0042781 A1* | 2/2019 | Lukacs | G06F 21/80 |
| 2019/0340103 A1* | 11/2019 | Nelson | G06F 11/3636 |
| 2020/0034528 A1* | 1/2020 | Yang | G06F 21/53 |
| 2020/0192669 A1* | 6/2020 | Buehler | G06F 9/30123 |
| 2020/0250333 A1* | 8/2020 | Nemoto | G06F 16/1865 |
| 2020/0334374 A1* | 10/2020 | Mandadi | G06F 16/22 |
| 2020/0364351 A1* | 11/2020 | Sanchez | G06F 3/0673 |
| 2020/0409996 A1* | 12/2020 | Zhang | G06V 20/47 |

FOREIGN PATENT DOCUMENTS

| | | | | |
|---|---|---|---|---|
| CN | 106709361 A | * | 5/2017 | G06F 21/604 |
| CN | 106776302 A | * | 5/2017 | G06F 11/3612 |
| EP | 2230616 A1 | * | 9/2010 | G06F 21/566 |
| RU | 2298880 C2 | * | 5/2007 | H04L 29/06 |
| WO | WO-9300633 A1 | * | 1/1993 | G06F 11/3624 |
| WO | WO-0104743 A2 | * | 1/2001 | G06F 12/0253 |
| WO | WO-2016068996 A1 | * | 5/2016 | G06F 21/50 |
| WO | WO-2018225070 A1 | * | 12/2018 | |
| WO | WO-2020038243 A1 | * | 2/2020 | G06F 16/739 |
| WO | WO-2020131664 A1 | * | 6/2020 | G06F 16/95 |

OTHER PUBLICATIONS

Sarikaya, Behcet, and Xiao Zheng. "SIP paging and tracking of wireless LAN hosts for VoIP." IEEE/ACM Transactions on Networking 16, No. 3 (2008): 539-548. (Year: 2008).*

Daglis, Alexandras, Dmitrii Ustiugov, Stanko Novaković, Edouard Bugnion, Babak Falsafi, and Boris Grot. "SABRes: Atomic object reads for in-memory rack-scale computing." In 2016 49th Annual IEEE/ACM International Symposium on Microarchitecture (MICRO), pp. 1-13. Ieee, 2016. (Year: 2016).*

Kornaros, George, et al. "Hardware support for cost-effective system-level protection in multi-core socs." In 2015 Euromicro Conference on Digital System Design, pp. 41-48. IEEE. 2015. (Year: 2015).*

Griffith, Rean, and Gail Kaiser. "A runtime adaptation framework for native C and bytecode applications." In 2006 IEEE International Conference on Autonomic Computing, pp. 93-104. IEEE, 2006. (Year: 2006).*

Bhatti, Rafae, Basit Shafiq, Mohamed Shehab, and Arif Ghafoor. "Distributed access management in multimedia IDCs." Computer 38, No. 9 (2005): 60-69. (Year: 2005).*

Duggan, Dominic. Service-oriented architecture. Wiley-IEEE Press, 2012. (Year: 2012).*

Kienzle, Darrell, Ryan Persaud, and Matthew Elder. "Endpoint Configuration Compliance Monitoring via Virtual Machine Introspection." In 2010 43rd Hawaii International Conference on System Sciences, pp. 1-10. IEEE, 2010. (Year: 2010).*

Chiueh, Tzi-cker, Matthew Conover, and Bruce Montague. "Surreptitious deployment and execution of kernel agents in windows guests." In 2012 12th IEEE/ACM International Symposium on Cluster, Cloud and Grid Computing (ccgrid 2012), pp. 507-514. IEEE, 2012. (Year: 2012).*

Oracle, "Chapter 1: Introduction—Java Native Interface", Retrieved from https://docs.oracle.com/javase/8/docs/technotes/guides/jni/spec/intro.html##java_native_interface_overview on Nov. 25, 2019, pp. 1-5.

(56) References Cited

OTHER PUBLICATIONS

Unknown, "Java Virtual Machine Tool Interface", Retrieved from https://eclipse.github.io/openj9-docs/interface_jvmti/ on Nov. 25, 2019, pp. 1-35.

* cited by examiner

Obtain, e.g., via programmatic interfaces of an access monitoring and reporting service (AMRS) and/or via automated application analysis, indications of target data structures (TDSs) of one or more applications whose in-memory accesses are to be tracked at a computing environment (e.g., resources of a distributed collection of services collectively handling transaction requests) 901

↓

Identify sources (e.g., physical and/or virtual machines) of access requests to the TDSs (e.g., via programmatic interfaces, network message flow pattern analysis, etc.) 904

↓

Configure/activate respective memory access tracking agents (MATAs) at access request sources 907

↓

Detect (at MATAs) access requests and associated raw context information (e.g., thread stacks, contents of the TDSs and/or other data) 910

↓

Optionally, filter/transform the raw context information (e.g., based on filter descriptors submitted by AMRS clients) 913

↓

Provide indications of occurrences of access requests and associated context information 916

FIG. 9

EFFICIENT DETECTION OF IN-MEMORY DATA ACCESSES AND CONTEXT INFORMATION

BACKGROUND

In recent years, more and more computing applications are being run in distributed execution environments in which a given data structure may be accessed from multiple programs. In many cases, such applications are implemented at services of provider networks or cloud-based environments, and libraries or software development kits (SDKs) may be used by multiple components of the services to access shared data. A provider network may enable some clients to acquire resources, such as virtual and/or physical computing devices, storage devices, and the like via easy-to-use programmatic interfaces, and run applications using combinations of the resources, with the provider network providing desired levels of scalability, availability, fault resilience and the like. The physical machines of the provider network may be distributed among numerous data centers in different cities, states or countries, in some cases enabling clients anywhere in the world to utilize a near-inexhaustible pool of resources.

Some data structures of applications run at distributed network-accessible service may contain data that requires high levels of security, such as credit card numbers or other financial data, health-related information, and the like. A number of techniques, including TLS (Transport Layer Security), IPSec (Internet Protocol Security) and other protocols at various layers of the networking software/hardware stack have been developed to provide reassurance with respect to the connections used to access the application provider's resources—i.e., to answer the equivalents of the end-user questions "Is the data contained in my service request vulnerable to attack during its transmission to its destination?" or "Is the identity of organization with which I am communicating verifiable?". Software libraries that implement popular security protocols are included in most operating systems, and application developers often rely on using such libraries. To prevent malicious entities from breaching the security of data transfers, sophisticated encryption algorithms compatible with the standard protocols may be employed.

After the sensitive data reaches the provider's resources, however, it may still be accessed from a number of different service components. For example, dozens of lower-level services may be involved in processing some types of requests directed at e-retail sites or other service providers, and such lower-level services may therefore have access to potentially sensitive data. With concerns increasing recently regarding data misuse, privacy breaches and the like, the problem of detecting and auditing accesses to sensitive data while still providing high levels of performance remains challenging.

BRIEF DESCRIPTION OF DRAWINGS

FIG. 9 is a flow diagram illustrating aspects of operations that may be performed to implement efficient detection and context-rich reporting of accesses to targeted data structures, according to at least some embodiments.

Figure 1:
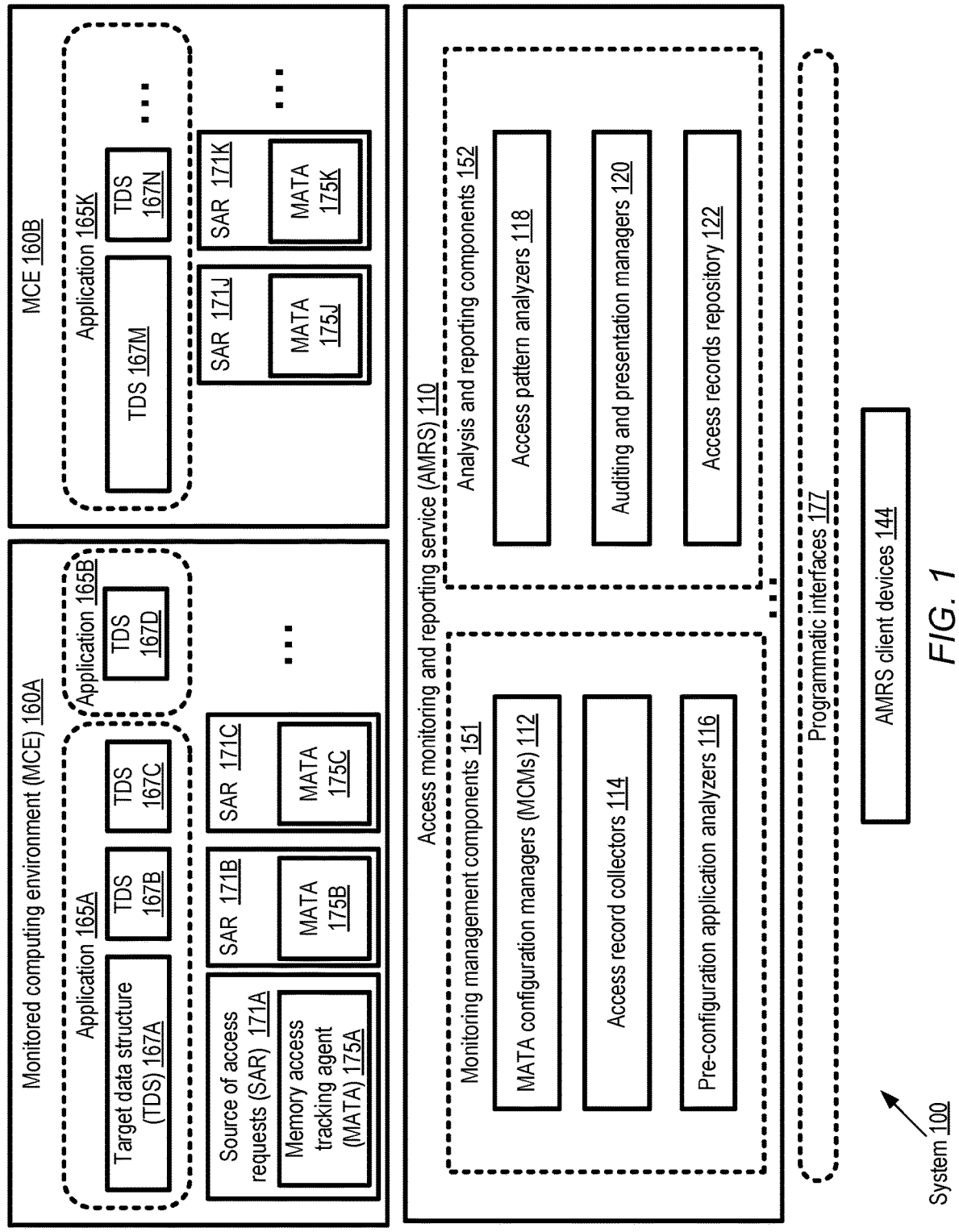
FIG. 1 illustrates an example system environment in which a network-accessible access monitoring and reporting service may be implemented for a plurality of applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficient monitoring and reporting of accesses to in-memory data structures at computer systems. The techniques described herein may be implemented at a wide variety of systems, including for example production servers used to implement large-scale Internet-accessible services, applications running at a virtualized computing service of a provider network or cloud computing environment, and the like in different embodiments. In at least some embodiments, at a high-level, the following types of tasks related to the monitoring and reporting of accesses may be performed: (a) identifying a set of target data structures of one or more applications whose accesses are to be detected, (b) determining a set of access sources (e.g., respective computing systems/hosts, or programs running at a single computing system) from which requests to access the target data structures are expected, (c) deploying/configuring low-overhead memory access tracking agents at such sources, (d) collecting records of requested memory accesses, and associate context information (such as thread stacks as well as actual values stored in the data structures at the time of the access) obtained by the memory access tracking agents, (e) optionally filtering/transforming the collected information and/or (f) presenting the access and context information to one or more consumers (e.g., to clients of an access tracking and reporting service or tool, and/or to programs which may initiate automated responsive actions such as generating audit logs or pre-loading a cache based on the access and context information).

As one skilled in the art will appreciate in light of this disclosure, certain embodiments may be capable of achieving various advantages, including some or all of the following: (a) substantially enhancing the security of applications which may process potentially sensitive data, by providing context-rich records of accesses to such data without impacting the performance of such applications even in production environments, (b) improving the performance of applications, e.g., by providing information that can be used for pre-loading of frequently-accessed data into caches, and used for the reduction of redundant accesses, and (c) improving the user experience of administrators or other users responsible for computer system security, e.g., by providing customized filtered views of data structure accesses.

According to some embodiments, a system may comprise one or more computing devices. The devices may comprise executable instructions that when executed on or across one or more processors cause the one or more computing devices to obtain an indication of one or more target data structures of one or more applications which are to be monitored. The data structures may be referred to as "targets" because accesses to their in-memory representations are to be tracked, e.g., at the request of a client of an access monitoring and reporting service (AMRS). In some embodiments, the AMRS may be implemented using resources of a provider network or public cloud computing environment; in other embodiments, the AMRS may not necessarily utilize cloud computing resources. In addition to the target data structures, one or more sources of access requests (such as physical hosts or servers, virtual machine execution environments, and the like) directed to the target data structures may be identified in various embodiments. In some embodiments, a client may simply provide a list of access sources, while in other embodiments, network message flow patterns and the like may be analyzed to discover at least some of the access sources. Similarly, in some embodiments, a client may provide a list of target data structures of interest; in other embodiments, the client may instead provide one or more properties or characteristics of target data structures (e.g., that data structures with the string "credit" or "card" in their names are likely to be of interest), and the AMRS may analyze application code (including for example method names and signatures, function names, as well as data structure names) to identify target data structures. In at least one embodiment, an AMRS may utilize machine learning models to automatically identify candidate target data structures, e.g., based on analysis of the names of the data structures, the names of methods/functions/procedures which read or modify the data structures, and/or software package names.

A respective memory access tracking agent (MATA) may be configured at each of the access request sources in various embodiments, e.g., by an administrative component of the AMRS. The MATA may, for example, comprise one or more programs whose executable code (e.g., byte code) may be placed into a directory or folder indicated in an environment variable (such as a class path variable) at the access request source in some embodiments. A MATA may detect an access request directed to a particular in-memory representation of a target data structure. In some cases, the access request may, for example, originate at a program running within a virtual machine; in other cases, the access may originate at a program which runs on physical hardware without an intermediary virtualization layer. The source code of the program may not have to be modified to enable the detection of memory accesses in at least some embodiments.

In addition to detecting the memory access requests themselves, in various embodiment a MATA may also obtain one or more types of context information pertaining to the memory accesses. Such information may include, for example, a thread stack indicating the invocation unit (e.g., method, function or procedure) from which the access was requested, the source code line number of the invocation unit, as well as the chain of other invocation units whose invocations led to the access request being issued. In at least some embodiments, the context information may also include an indication of the contents of the data structure at the time at which it was accessed—e.g., the specific values stored in the data structure, the data type of the data structure, and so on. In some embodiments, a raw or unfiltered version of the context information may be captured by the MATA. The raw version may be modified, e.g., based on one or more filtering criteria indicated by a consumer of the context information such as an AMRS client. Such filtering or transformation of the context information may be performed at any of several layers or components of the AMRS, or even at the MATA itself, in different embodiments. Respective indications of the occurrences of the access requests, as well as raw and/or filtered versions of the context information, may be provided to one or more destinations in various embodiments (e.g., to an AMRS client, and/or to downstream programs such as cache pre-loaders or the like indicated by an AMRS client).

The timing with which the in-memory access information is presented to a client or to destination programs may differ in various embodiments. In some embodiments, an indication of a memory access to a target data structure may be provided as soon as it becomes available; in other embodiments, records of such access and accompanying context information may be batched and provided periodically or in response to programmatic requests for such information. In at least some embodiments, an AMRS may also provide various types of aggregated metrics regarding access to target data structures, such as the overall rate at which such accesses occur, the distribution of the accesses across different sources, the temporal distribution of the accesses (e.g., whether more accesses occur during a particular hour of a business day than during other hours), and so on. In one embodiment, an AMRS may provide metrics regarding potentially redundant accesses of the same target data structure from the same program, which may provide an opportunity for potentially restructuring the code of the program.

According to some embodiments, an application being monitored by the AMRS may be written at least in part in a system-agnostic programming language such as Java™, and may run in virtual machine environments such as JVMs (Java™ virtual machines). A programming language may be referred to as system-agnostic or system-independent in various embodiments if programs written in the language may be run, e.g., without requiring re-compilation, at any of a variety of computing devices with different operating systems, different underlying hardware architectures and the like. An application program written in a system-agnostic language may, for example, be converted to byte code which can be executed using virtual machines instantiated within any of numerous operating systems in some embodiments. In contrast, programs written in system-specific programming languages (such as C) may have to be re-compiled for execution at different operating systems and/or hardware devices. In at least one embodiment in which the monitored application is written in a system-agnostic programming language, a MATA may employ at least some system-specific code (e.g., using JNI or the Java™ Native Interface), e.g., to obtain a portion of the context information, to verify that target data structures are present in the application, and so on. The MATA may itself be written in code which is not system-agnostic in some embodiments, such as C or C++; in other embodiments, at least a portion of a MATA may also be written in a system-agnostic language. In some embodiments, the run-time environment of the application may implement an access notification interface (e.g., a JVM Tool Interface (JVMTI) "watch" API), which may be utilized by a MATA to detect at least some of the memory accesses directed to the target data structures. In one embodiment, executable code may be dynamically injected into an application (without altering the source code) to detect memory accesses. Both reads and writes may be monitored in some embodiments.

Example System Environment

FIG. 1 illustrates an example system environment in which a network-accessible access monitoring and reporting service may be implemented for a plurality of applications, according to at least some embodiments. As shown, system 100 comprises resources and artifacts of an access monitoring and reporting service (AMRS) 110, which may be utilized to track accesses to in-memory data structures of one or more applications being run in monitored computing environments (MCEs) 160 such as 160A or 160B. The AMRS 110 may be broadly divided into two types of components in the depicted embodiment: monitoring management components 151, and analysis and reporting components 152. The monitoring management components 151 may be broadly responsible for configuring and deploying agents that gather records of memory accesses and retrieving/obtaining such records from the agents, while the analysis and reporting components 152 may be broadly responsible for processing and presenting the collected information in the depicted embodiment. In some embodiments, the monitoring management components 151 and/or the analysis and reporting components 152 may be implemented as distinct services or micro-services instead of being implemented within a single AMRS 110.

The AMRS 110 may implement one or more programmatic interfaces 177 in the depicted embodiment, such as web-based consoles or portals, a set of application programming interfaces (APIs), command-line tools, graphical user interfaces and the like. The interfaces 177 may be used by clients of the AMRS to submit programmatic requests pertaining to memory access tracking from client devices 144 (e.g., laptops, desktops and the like) in various embodiments, and to receive corresponding responses.

According to at least some embodiments, the AMRS may obtain indications (e.g., via the programmatic interfaces 177) of one or more data structures accessed by or from a set of applications, such as target data structures (TDSs) 167A, 167B or 167C of application 165A run at MCE 1601A, TDS 167D of application 165B of MCE 160A, TDSs 167M and 167N of application 165K at MCE 160B, and so on. The target data structures 167 may, for example, potentially include sensitive data such as credit card numbers, personally-identifiable information such as addresses, ages or other demographic details of individuals, and so on, and may therefore be selected as the targets of memory access monitoring. In some embodiments, one or more pre-configuration application analyzers 116 may examine the source code and/or executable code of one or more applications 165, examine application metadata such as the names of invocation units (methods, functions or procedures) and/or data structures accessed in the invocation units, and automatically identify (e.g., based on the names or identifiers of the data structures) a set of target data structures whose accesses are to be monitored using the metadata. For example, if the kinds of information for which accesses are to be tracked includes credit card information, data structures whose names contain the strings "credit", "card", "issuing bank" etc. may be identified as potential target data structures, and invocation units whose names contain similar strings may be examined to detect the specific data structures accessed therein (with such data structures also being classified as target data structures). In one embodiment, a client may indicate one or more properties of data structures to be designated as target data structures (e.g., the property that the name of the data structure contains the string "card" or "credit") and the application analyzers 116 may utilize such property information to generate a list of TDSs 167.

In some embodiments, one or more machine learning models may be trained (e.g., code analysis models, or language processing models) and used at the monitoring management components 151 to identify target data structures. In one embodiment, the AMRS 110 may identify a list of target data structure candidates based on analysis of application metadata, and provide the list to a client via a programmatic interface 177, enabling the client to designate one or more of the data structures as targets for monitoring. In at least one embodiment, by default, monitoring of memory accesses may be initiated for all the data structures of a given application for at least a short time period, e.g., for profiling or other purposes; as such, all the data structures of a given application may in some cases constitute examples of target data structures 167.

A plurality of sources of access requests (SARs) to the target data structures, such as SARs 171A, 171B, 171C (which generate requests to access TDSs 167A—167D) and SARs 151J and 171K (which generate requests to access TDSs 167M or 167N) may be identified by the AMRS 110 in at least some embodiments. A given SAR 171 may comprise, for example, a physical server or host, and/or a virtual machine or compute instance of a virtualized computing service. Within individual SARs 171, program code accessing the TDSs 167 (e.g., components of the applications 165, and/or components of other applications which may access the TDSs 167 via remote procedure calls or the like) may run in various embodiments. In some embodiments, AMRS clients may provide information identifying the SARs via the programmatic interfaces 177; in other embodiments, the monitoring management components 151 may, for example, analyze network message flow patterns within one or more MCEs 160 to detect potential sources of access requests. Such network message flow patterns may, for example, indicate that remote requests to access TDSs 167 may potentially be originating at one or more hosts or virtual machines.

Based on the obtained information about sources of access requests and target data structures, in some embodiments one or more memory access tracking agents 175 (e.g., MATA 175A, 175B 175C, 175J or 175K) may be set up at respective request sources 171 in the depicted embodiment. In at least one embodiment the MATAs 175 may be installed or configured by placing a file (e.g., a JAR (Java™ archive) file or other similar file containing executable or byte code) in a directory/folder location indicated in a class path configuration setting of a source of access requests. In other embodiments, the MATAs 175 may be installed using other techniques at the SARs, e.g., by utilizing an operating system's software package installer or the like. One or more MATA configuration managers (MCMs) 112 of the AMRS 110 may be responsible for deploying the MATAs and providing configuration information (such as the names of TDSs) to the MATAs in some embodiments (e.g., via respective configuration files in extended markup language (XML), JavaScript Object Notation (JSON) or the like). In at least some embodiments, changes to the source code and/or configuration settings of the applications 165 may not be required for memory access tracking by the MATAs; the detection and tracking of memory accesses may be transparent to the monitored applications and any other application programs running at the SARs 171A.

After the MATAs 175 have been configured, in some embodiments the MATAs may start transmitting records of detected memory accesses (targeted to the TDSs) to one or more access record collectors 114 of the AMRS. The information provided by the MATAs may indicate not just the occurrences of the memory accesses, but also context information (e.g., thread stacks, values or contents stored in the accessed TDSs at the time of the access, source code line numbers of the points in the code at which the accesses originate, and so on) which may be very helpful in understanding where in the software stack the requests originated, what data values was accessed, and so on. Such context information may be used in some embodiments to take responsive actions—e.g., to raise alerts about potential security violations, cause memory-accessing programs to be quarantined or shut down, and so on. The access records collectors 114 may in turn store the raw access records (e.g., records containing raw context information), or transformed versions of the access records, at an access record repository 122. The raw context information may not be as useful as a simplified or filtered version in some scenarios—for example, the thread stack may comprise hundreds of methods or functions, with only a few of names of the methods/ function being meaningful to consumers of the context information. In one embodiment, compressed or filtered versions of the context information may be stored in the repository 122 by access record collectors 114; in other embodiment, the raw context information may be stored, and filtering may be performed by the auditing/presentation managers 120 if required. In one embodiment, the MATAs themselves may filter or transform the raw context information before sending it to the access record collectors 114. In some embodiments, the access records collectors may send messages or signals to the MATAs to enable/disable memory access tracking—that is, memory access tracking may not necessarily be performed continuously at the MATAs in such embodiments.

In the embodiment depicted in FIG. 1, one or more access pattern analyzers 118 of the AMRs 110 may examine the records stored in the repository 122, e.g., to detect repeated accesses and/or suspicious patterns, to identify potential redundant accesses, and the like. One or more auditing and presentation managers 120 may prepare output data representing the captured memory access information, and cause the output to be transmitted to one or more destinations (such as client devices 144, security management systems external to the AMRS, and so on.) In some embodiments, filtering descriptors or transformation descriptors indicating the kinds of context information (e.g., the particular software layers for which thread stack information is to be retained, whether values of the accessed data are to be included, the format in which the context information and/or memory access occurrence information is to be provided, etc.) desired may be submitted by clients via programmatic interfaces 177, and the AMRS may provide output filtered and formatted accordingly. Auditing and presentation managers 120 may also provide various types of metrics regarding memory accesses to AMRS clients and/or other recipients programmatically, e.g., including the rates at which particular TDSs are accessed, the temporal distribution of such accesses, the distribution of accesses across different SARs, and so on.

Audit logs of at least some memory accesses may be generated and stored by the AMRS 110 in one embodiment. Such audit logs may in some embodiments be used to track down copies of TDS contents which may have to be deleted in accordance with privacy and other regulations. For example, in one embodiment, an indication may be received at the AMRS that in accordance with such a regulation, stored copies of a particular portion of a TDS, or an entire TDS, are to be deleted. At least some stored copies of the TDS or TDS portion may be identified using the information generated by the MATAs, as copying of TDS contents to a persistent storage device may typically be preceded by in-memory accesses which could have been captured by the MATAs.

Any of a number of underlying mechanisms may be employed by the MATAs to track memory accesses in different embodiments. In one embodiment, for example, executable code (e.g., byte code) may be dynamically injected into one or more applications 165 to detect the memory accesses. Such executable code may store or transmit records if/when memory accesses to specific objects such as TDSs are initiated in some implementations. In some embodiments, the applications 165 may be executed using run-time environments which support extremely efficient notification or watch mechanisms for data structures, and such access notification mechanisms may be set up and used by a MATA. In one embodiment, the applications themselves may be implemented using system-agnostic or hardware-agnostic programming languages, but the MATA may use system-specific or "native" low level APIs to capture at least some of the context information.

Example Monitored Environments

Figure 2:
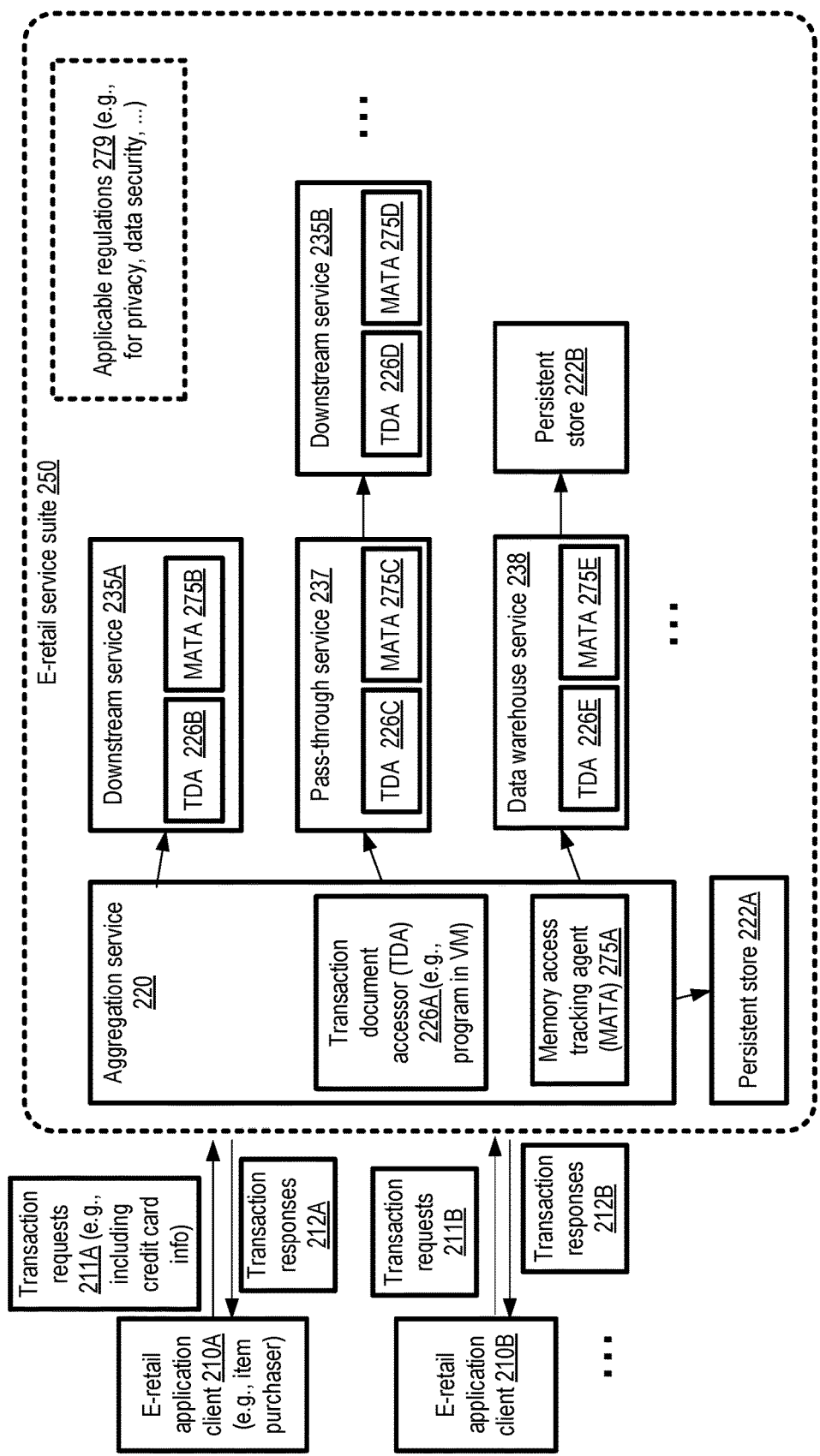
FIG. 2 illustrates an example e-retail service suite at which agents of an access monitoring and reporting service may be deployed, according to at least some embodiments.

FIG. 2 illustrates an example e-retail service suite at which agents of an access monitoring and reporting service may be deployed, according to at least some embodiments. In the depicted embodiment, several different network-accessible services of service suite 250 may participate in the processing of transaction requests 211 (such as 211A and 211B) submitted by e-retail application clients 210 including clients 210A and 210B.

A request aggregation service 220 may interact with several other services and subcomponents of the suite, including downstream services 235A, pass-through service 237 and data warehouse service 238, as well as a document store 222A to fulfill a request for a particular transaction, such as a purchase request for a particular item offered by the e-retail web site in the depicted embodiment. The term "downstream" may be used to refer to services 235A and 235B because their operations occur after at least some operations are performed at the aggregation service 220, and the term "pass-through" may be used to describe service 237 because its primary responsibility may comprise transferring one or more messages from the aggregation service to downstream service 235B. Some of the services may, for example, be responsible for such tasks as verifying a credit card number included in the transaction request, determining the set of shipping alternatives which may be available for delivery of a purchased item, determining whether the client 210A already has some amount of money available as credit from previous transactions, determining whether other offers/promotions should be presented to the client at checkout (e.g., based on the client's transaction history), and so on.

A transaction document may be created for the requested transaction in the depicted embodiment, e.g., by the aggregation service, and several of the other services may access and/or store a representation of the transaction document. Such a transaction document may represent one example of a target data structure whose accesses are to be tracked as the document is examined and/or modified by the services of the suite 250. One or more of the services of the suite may access comprise a respective transaction document accessor (TDA) program 226 which reads the contents of the transaction document from the memory at one or more hosts in the depicted embodiment—e.g., TDA 226A may run at the aggregation service 220, TDA 226B may run at downstream service 235A, TDA 226C may run at pass-through service 237, TDA 226E may run at data warehouse service 238, and TDA 226D may run at downstream service 235B. In at least one embodiment, some or all of the TDAs may comprise programs running within a virtual machine, such as a JVM (Java™ virtual machine), and may utilize a software development kit or library to access the target data structure.

In the example scenario depicted in FIG. 2, respective memory access tracking agents (MATAs) 275, such as MATAs 275A—275E, may be configured or deployed at one or more hosts or servers of the services of suite 250 at which the TDAs 226 run. For example, in embodiments in which the TDAs run at respective JVMs, one or more JAR files containing executable byte code and/or configuration files of a MATA 275 may be placed in a class path indicated by a configuration setting at each of the hosts/servers. The MATAs may detect accesses to the transaction documents, capture associated context information, and transfer records indicating the accesses and the context to other components of an access monitoring and reporting service (AMRS) similar in features and functionality to AMRS 110 of FIG. 1 in the depicted embodiment.

In addition to accessing the in-memory representations of the transaction documents, one or more of the services may store at least portions of the transaction documents at persistent storage devices in the depicted embodiment. Thus, for example, the aggregation service 220 may store at least a portion of transaction documents in persistent store 222A, while data warehouse service 238 may store at least a portion of the transaction documents at persistent store 222B. In accordance with applicable regulations 279 (e.g., regulations governing privacy, data security and the like), the operators of the e-retail service suite may be responsible in some embodiments for (a) identifying copies of data contained in the transaction documents and (b) deleting such copies. Using the information captured by the MATAs 275, the AMRS may be able to provide a list of the TDAs which have accessed the transaction documents, and hence could have stored persistent copies of the documents. As a result, compliance with regulations 279 may be facilitated by the MATAs and the AMRS in the depicted embodiment. After all the operations that have to be performed to satisfy a particular transaction request 211 have been completed at the e-retail service suite 250, a corresponding transaction response 212 (e.g., response 212A or 212B) may be sent to the clients acknowledging the completion of the request processing in the depicted embodiment.

Figure 3:
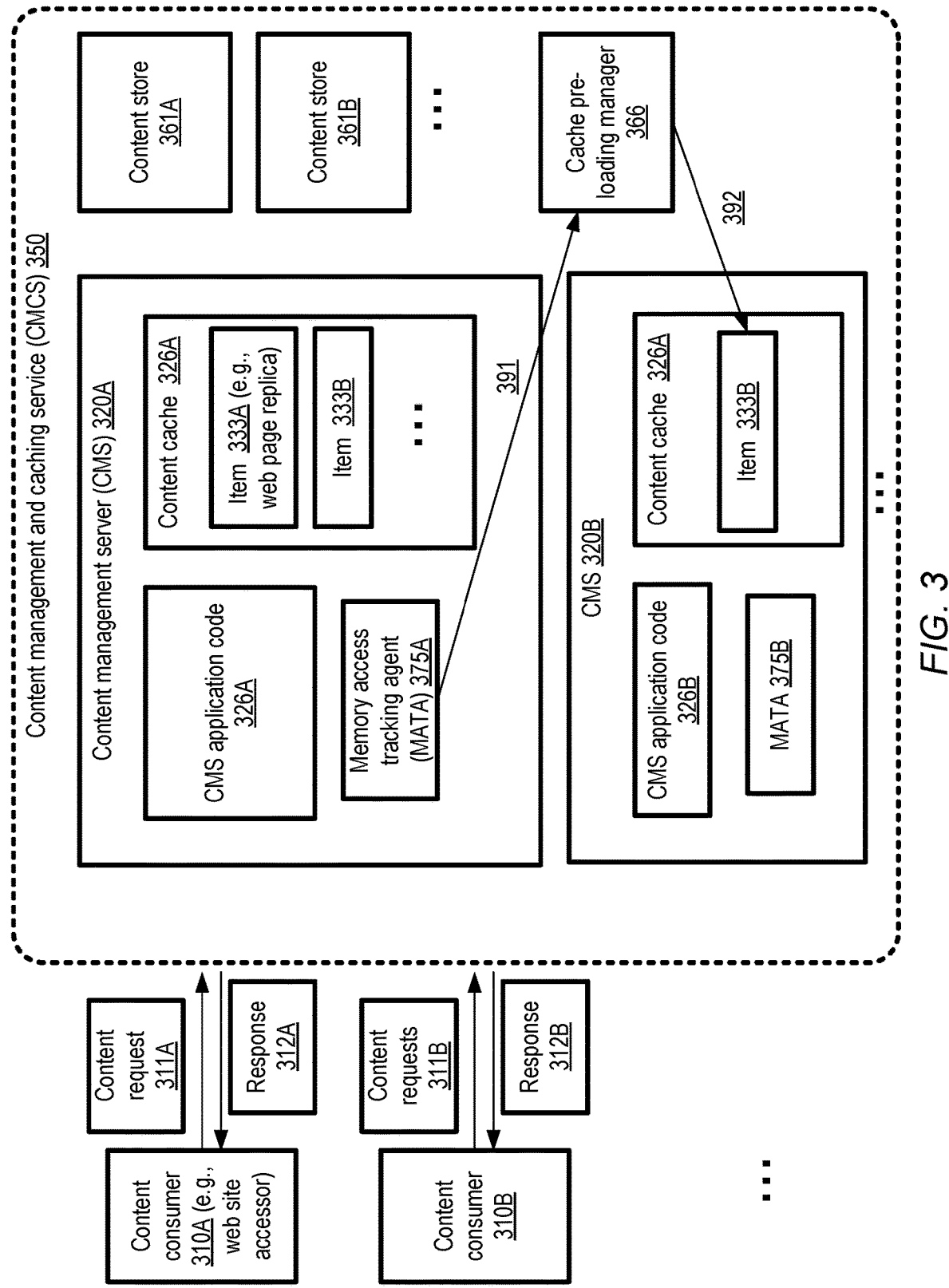
FIG. 3 illustrates an example content management and caching service at which agents of an access monitoring and reporting service may be deployed, according to at least some embodiments.

FIG. 3 illustrates an example content management and caching service at which agents of an access monitoring and reporting service may be deployed, according to at least some embodiments. Content management and caching service (CMCS) 350 may comprise a plurality of content management servers (CMSs) in the depicted embodiment, including CMS 320A and 320B, which may be distributed among numerous data centers or other premises around the world. The CMCS 350 may be set up in order to accelerate the delivery of various types of content (e.g., web pages, streaming music, streaming video, etc.) of a collection of content stores 361 (e.g., content store 361A and 361B) to content consumers, regardless of the physical locations of the content consumers or the devices from which the consumers submit requests for the content. For example, content consumer 310A, an accessor of one or more web sites, may be submitting content requests 311A from a location close to a data center at which CMS 320A is located, while content consumer 310B may submit content requests from a location which is much further from CMS 320A; as a result, the requests of consumer 320B may be processed at CMS 320B which is located closer to consumer 310B.

In the example scenario shown in FIG. 3, individual ones of the CMSs 320 may comprise respective application code 326 as well as a respective content cache 326 at which replicas or copies of various content items 333 may be stored. The original or primary versions of the content items 333 may reside at persistent storage devices of the content stores 361 at the depicted embodiment. Replicas of the original items may be placed in the content caches 326— e.g., item 333A of cache 326A may represent a copy of at least a portion of one web page, item 333B may represent a copy of a portion of another web page, and so on. In at least some embodiments, multiple levels of caching may be performed at the CMSs—e.g., persistent storage as well as main memory may be used. In response to content requests 311, items may be retrieved from the caches (or if the items are not present in the caches, from the content store) and provided to the requesting consumers in response 312 (e.g., 312A or 312B).

In the depicted embodiment, respective MATAs 375, such as MATA 375A and 375B, may be set up at each of the CMSs 320 to track accesses of the in-memory content items. The MATAs may capture accesses directed to different in-memory content items 333, and provide records of the accesses to an AMRS similar to AMRS 110 of FIG. 1 in then depicted embodiment. Presentation managers and/or other components of the AMRS may in turn provide information about the accesses, including how frequently particular content items 333 are accessed, to one or more cache pre-loading managers 366 in the depicted embodiment, as indicated by arrow 391. If a particular content item 333B appears to be popular, a cache pre-loading manager 366 may pre-load the item (e.g., 333B) into one or more other CMS content caches such as 326A in the depicted embodiment.

Note that at least in some embodiments, in order to pre-load such items, it may be necessary for the MATAs to capture the actual value or contents stored in the in-memory cache data structures, which may only be made possible because the MATAs capture detailed context information.

For example, all the web pages whose replicas are stored in a particular in-memory cache may be stored within an array of web page objects, so simply detecting that the web page object array (or even a particular index within such an array) is accessed frequently may be insufficient to help with pre-loading in such embodiments; instead, at least some information about the specific content stored in the frequently-accessed portion of the array may be useful for pre-loading purposes.

Figure 4:
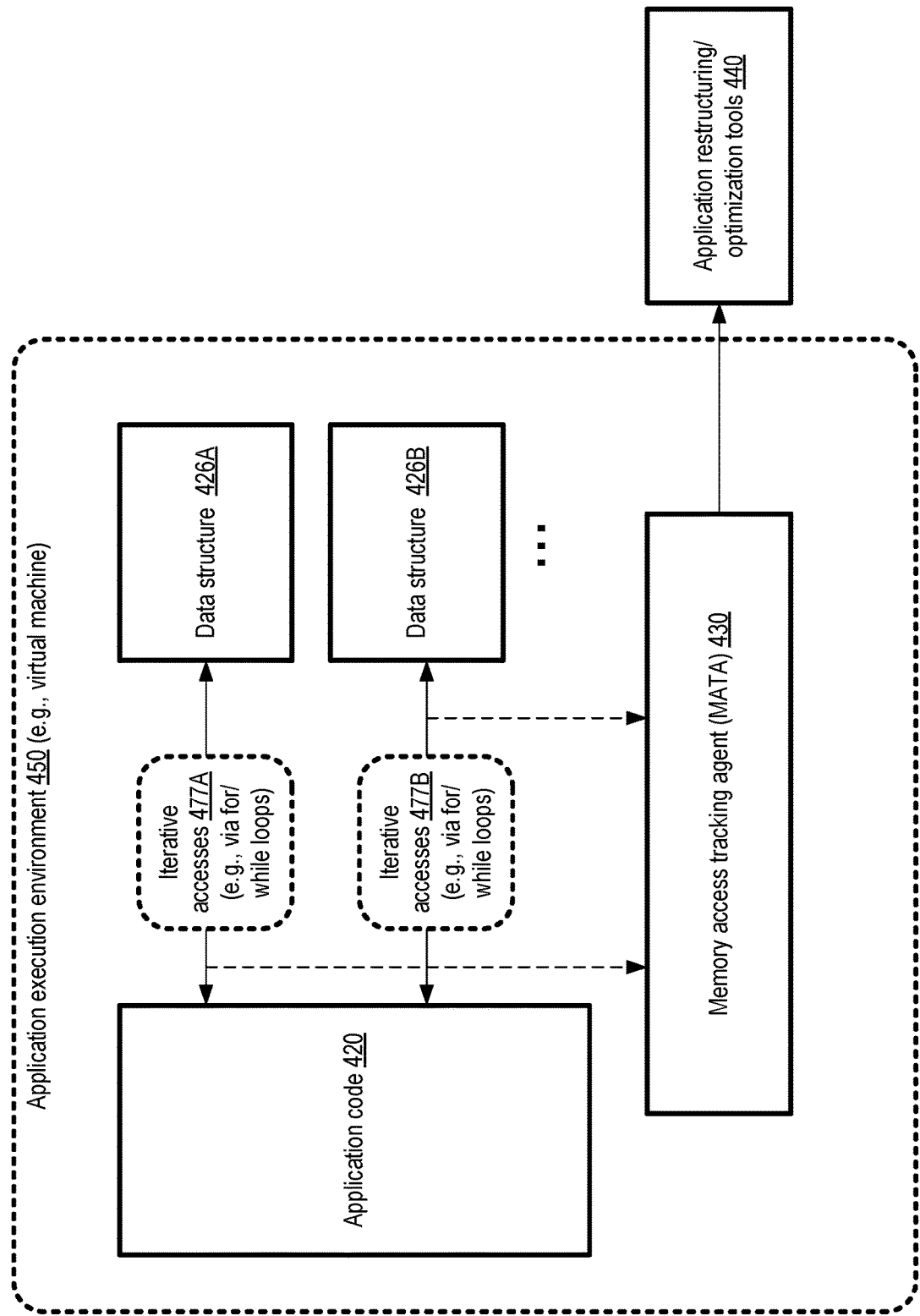
FIG. 4 illustrates an example use of memory access tracking agents to detect iterative accesses to data structures, according to at least some embodiments.

FIG. 4 illustrates an example use of memory access tracking agents to detect iterative accesses to data structures, according to at least some embodiments. In the embodiment depicted in FIG. 4, application code 420 runs within an application execution environment 450 (e.g., a virtual machine), and the code may access data structures such as 426A and 426B repeatedly, e.g., via the equivalent of while loops, for loops and other similar programming constructs.

A memory access tracking agent (MATA) 430 may be configured or deployed at the application execution environment 450 in the depicted embodiment, and may track accesses directed to various target data structures such as 426A and 426B from the application code 420. In some embodiments, accesses to all the data structures of the application may be tracked, at least for short periods of time, to obtain samples of the access patterns; in other embodiments, only accesses directed to a subset of data structures may be tracked.

The MATA 430 may be able to capture evidence of iterative accesses 477A or 477B in the depicted embodiment, which may occur for example at the rate of hundreds or thousands of accesses per second for at least some time periods. The records of such iterative accesses, including associated thread stacks and other context information, may be provided, e.g., via presentation managers and other components of an AMRS to one or more application restructuring or optimization tools 440 in the depicted embodiment. Such tools may, for example, use the AMSR-provided context information to detect opportunities for refactoring the application's source code to reduce the number of times the same data is accessed redundantly. Such refactoring may help to improve overall application performance. In some embodiments, the AMRS may implement programmatic interfaces which present indications of potential redundant accesses to one or more data structures, e.g., in the form of access rates/counts as well as associated thread stack information.

Example Dataflow

Figure 5:
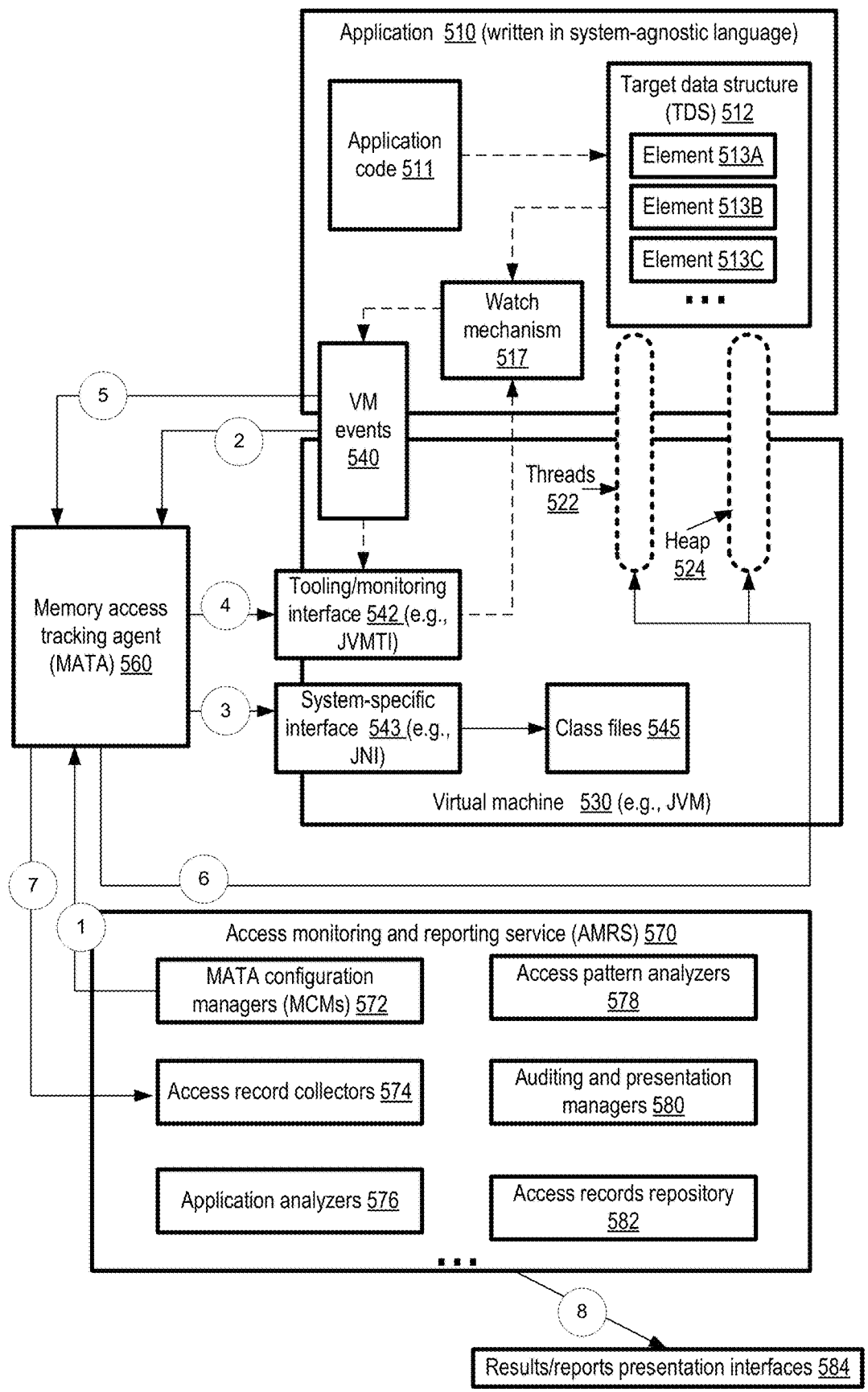
FIG. 5 illustrates details of an example dataflow for tracking memory accesses of an application written in a system-agnostic programming language and being executed using a virtual machine, according to at least some embodiments.

FIG. 5 illustrates details of an example dataflow for tracking memory accesses of an application written in a system-agnostic programming language and being executed using a virtual machine, according to at least some embodiments. In the depicted embodiment, application 510, which may be written in a system-agnostic programming language such as Java™, comprises code 511 from which various elements 513 (e.g., 513A, 513B or 513C) of a target data structure 512 are accessed. The application 510 may be run using a virtual machine 530, such as a JVM in the depicted embodiment, which provides a set of tooling or monitoring interfaces 542 (e.g., a JVM Tool Interface or JVMTI) as well as a set of "native" or system-specific interfaces (e.g., Java™ Native Interface or JNI). Generally speaking, the tooling interfaces may allow programs (such as a MATA 560) to inspect the state of applications running at the virtual machine 530 and to control the execution of such applications. In various embodiment, system-specific interfaces 543 may present a programming framework enabling programs (such as the MATA 560) to utilize languages which are not system-agnostic (including for example C, C++, or even assembly language) to interact with the virtual machine 530 and applications such as 510 written in a system-agnostic language.

As indicated by the arrow labeled "1", a MATA configuration manager of an access monitoring and reporting service (AMRS) 570, similar in features and functionality to AMRS 110 of FIG. 1, may deploy the MATA 560 to the host or server where the virtual machine is to be executed in the depicted embodiment. For example, an archive file containing executable code and/or configuration files of the MATA 560 may be placed in a directory or folder which is part of the class path environment variable applicable to the virtual machine in some implementations. The AMRS 570 may include various other components, such as application analyzers 576, access record collectors 574, access pattern analyzers, auditing and presentation managers 580 and an access records repository 582 in the depicted embodiment. The application analyzers 576 may, for example, examine the code or other metadata/artifacts of the application to identify the target data structures whose accesses are to be monitored, and provide an indication of such data structures in the form of one or more configuration files to the MATA.

When the virtual machine 530 starts up, a corresponding notification may be received at the MATA 560 in the depicted embodiment, indicated by the arrow labeled "2". In one implementation in which the virtual machine is a JVM, a notification of a "vminit" (virtual machine initialization) event may be sent to the MATA 560 from a VM events component 540 of the JVM.

After the startup of the virtual machine, the MATA 560 may utilize a system-specific interface 543 to verify that the to-be-monitored data structure 512 (whose fully-qualified names and/or other metadata may have been included in the MATA's configuration settings) is actually part of the application 510, as indicated by the arrow labeled "3". In at least some embodiments, this step may involve accessing the executable code (such as class files 530) of the application to verify that the target data structure and its elements 513 are both referenced in the executable code. In one embodiment, functions/methods such as FindClass( ) may be used to verify the presence of the TDS 512, and functions/methods such as FindField( ) may be used to verify the presence of elements 513 within the class representing the TDS 512.

Having verified the existence of the target data structure, the MATA 560 may use the tooling interface 542 to set up automated notifications of accesses to the TDS 512 in the depicted embodiment, as indicated by the arrow labeled "4". One or more watch mechanisms 517 may be activated, e.g., using tooling APIs similar to setFieldWatch( ) or setMethodWatch( ) to ensure that the MATA is notified whenever reads to the elements of the target data structures are requested or performed by the application code.

When the application code 511 issues an access request directed to an element 513 or to the entire TDS 512, a message indicating the access is transmitted to the MATA 560 in the depicted embodiment from the VM events 540, as indicated by the arrow labeled "5". In some embodiments, both read and write accesses (including updates/modifications and/or deletes) may be monitored; in other embodiments, only reads or only writes may be monitored, e.g., based on preferences indicated via a programmatic interface by an AMRS client on whose behalf the monitoring is being performed.

The MATA may obtain raw context information pertaining to the access requested by the code 511, such as the thread stack (obtained from a threads management component 522 of the virtual machine) and/or the contents of the element 513 or the entire TDS 512 (by accessing the heap 524) in the depicted embodiment in response to the notification of the access. The arrow labeled 6 indicates the acquisition of the raw context information by the MATA. In some embodiments, in the case of a write access, the post-modification value(s) stored at the element(s) being modified may be captured; in other embodiments, the pre-modification values may also or instead be captured by the MATA 560.

As indicated by the arrow labeled "7", the MATA may transmit one or more records indicating the occurrence of the access, as well as associated context information, to the access record collectors 574 of the AMRS 570 in the depicted embodiment. In at least some embodiments, a timestamp indicating the precise time at which an access was requested or performed may be generated or obtained at the MATA 560 and included in the information provided to the AMRS 570. In one embodiment, records about each access may be sent individually to the AMRS; in other embodiments, the MATA 560 may send information about groups or batches of accesses at a time. In at least one embodiment, a MATA may cause the abandonment of certain types of accesses in addition to or instead of simply recording information about the accesses—e.g., if writes to certain TDSs are not permitted, but a write request is nevertheless generated and detected, the write may be aborted based on instructions sent by the MATA to the run-time environment (e.g., Java™ Runtime Environment or JRE) being used. In some embodiments, interfaces and/or message sequences other than those depicted in FIG. 5 may be used to detect and report on accesses to in-memory data structures of monitored applications.

Example Context Information

Figure 6:
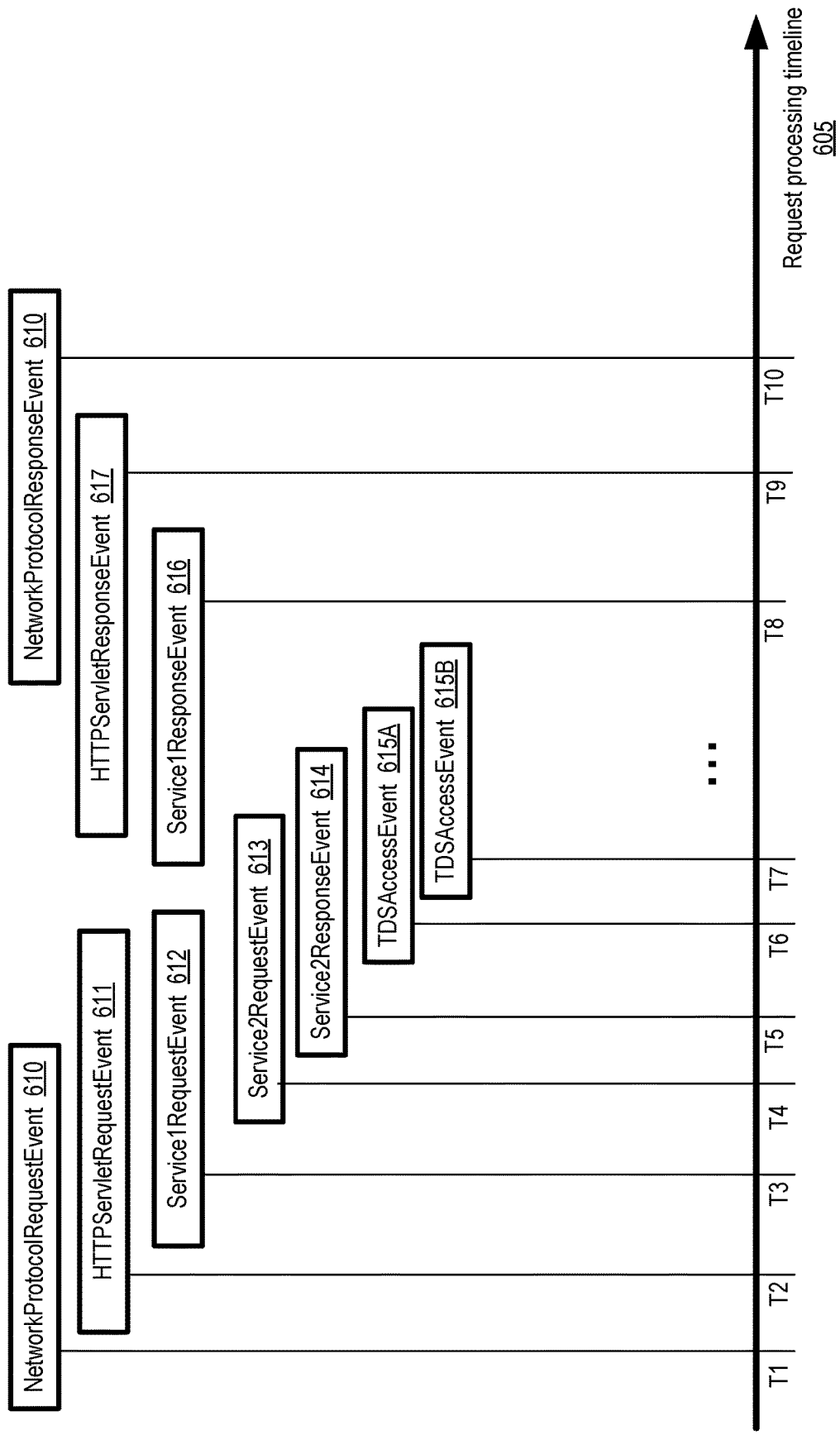
FIG. 6 illustrates an example set of tracked events which may be used to provide context information pertaining to accesses directed at a data structure, according to at least some embodiments.

FIG. 6 illustrates an example set of tracked events which may be used to provide context information pertaining to accesses directed at a data structure, according to at least some embodiments. In the example scenario depicted in FIG. 6, an HTTP (HyperText Transfer Protocol) or HTTPs (secure HTTP) request eventually leads to one or more accesses of a target data structure monitored with the help of a MATA of an AMRS similar to AMRS 110 of FIG. 1.

At time T1 along request processing timeline 605 in the depicted embodiment, a NetworkProtocolRequest Event 610 may occur (e.g., a function or method for handling a network protocol request may be invoked). At time T2, a corresponding HTTP servlet request event 611 may occur, leading to a call to a particular service Service1 at time T3. The Service1RequestEvent 612 may be followed by an invocation of an interface of a downstream service, Service 2, in the depicted embodiment, as indicated by Service2RequestEvent 613 at time T4.

Service 2 may complete the requested operations at time T5, as indicated by the Service2ResponseEvent 614. At times T6 and T7, respective accesses to a target data structure (TDS) (TDSAccessEvents 615A and 615B) may be requested in the depicted example scenario. Later, at time T8, Service 1 may complete its response, and a Service1ResponseEvent 616 may be recorded, followed by an HTTPServletResponseEvent 617 and an eventual NetworkProtocolResponseEvent 610.

In at least some embodiments, as mentioned earlier, the context information collected by an MATA may include a current thread stack at the time of each TDSAccessEvent 615, along with values stored within the target data structure at the time of the access. The thread stack collected for the TDS accesses shown at times T6 and T7 along timeline 605 may indicate, for example, that an HTTP servlet was being executed in response to a message received over a network protocol when the access occurred. In at least some embodiments, line numbers of the source code files may also be provided in the thread stack information, so the fact that the access events occurred after a downstream service Service2 was invoked and completed its operations may also be indicated in the context information. In at least some embodiments, the thread stack information collected by the MATA may be presented to AMRS clients in a timeline format similar to that shown in FIG. 6. In some embodiments, an AMRS client may provide filtering descriptors indicating that only events at specified layers of the software stack (e.g., the service request layers represented by events 612, 613 and so on) are of interest, and the AMRS may modify the context information accordingly before presenting it to the client.

Example Programmatic Interactions

Figure 7:
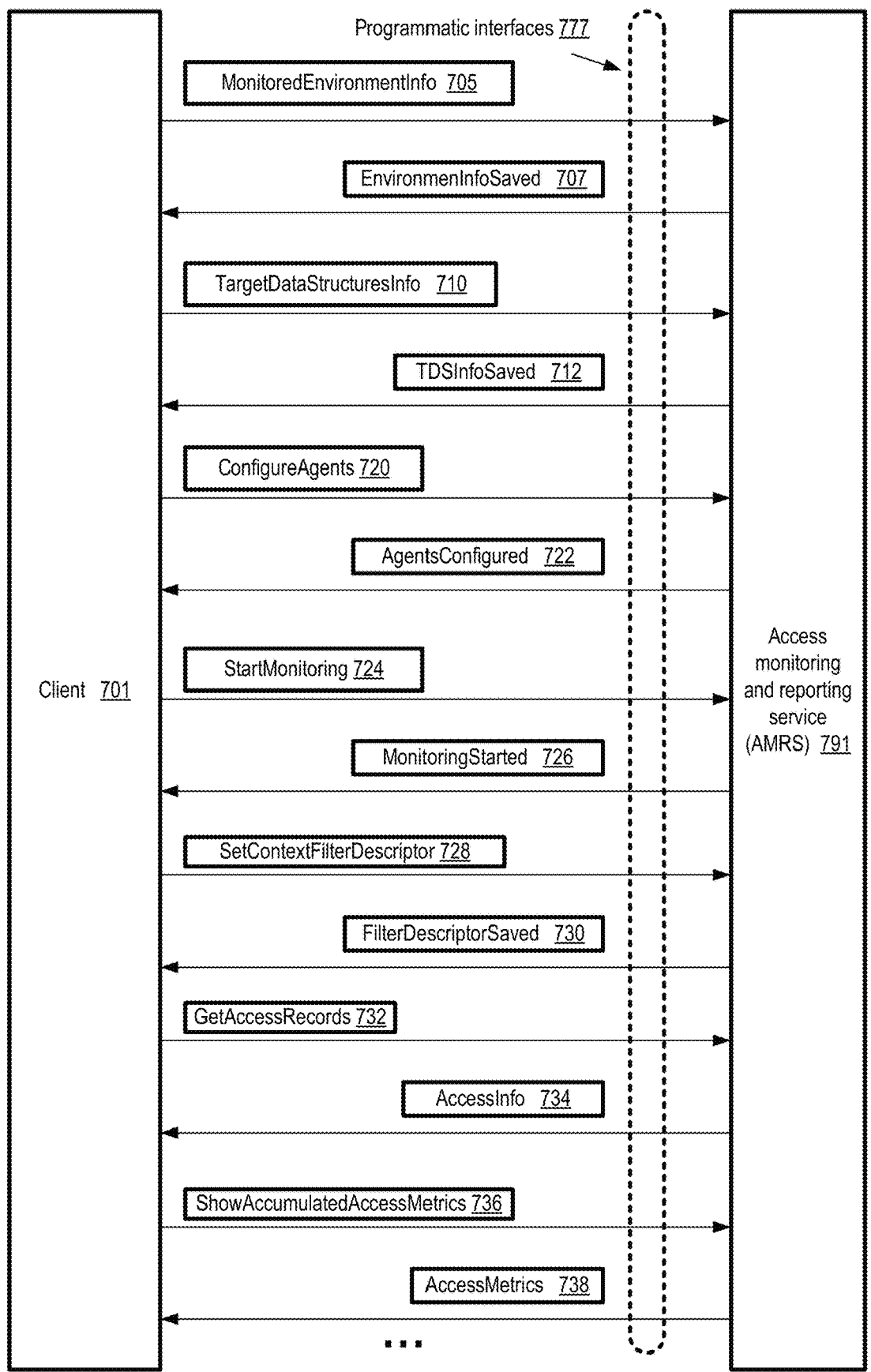
FIG. 7 illustrates example programmatic interactions between a client and an access monitoring and reporting service, according to at least some embodiments.

FIG. 7 illustrates example programmatic interactions between a client and an access monitoring and reporting service, according to at least some embodiments. In the depicted embodiment, an AMRS 791, similar in features and functionality to AMRS 110 of FIG. 1, may implement one or more programmatic interfaces 777, which may be used by clients 701 to submit messages or requests regarding various aspects of memory monitoring and reporting, and to receive corresponding responses. The interfaces 777 may include, for example, one or more web-based consoles or portals, application programming interfaces (APIs), command-line tools, graphical user interfaces, and then like in various embodiments.

A client 701 my submit a MonitoredEnvironmentInfo message 705 via the interfaces 777 in the depicted embodiment to provide information about the application whose accesses are to be monitored, the set of hosts or servers from which accesses to in-memory representations of data structures are expected, and so on. The provided information may be saved at the AMRS, and an EnvironmentInfoSaved messages 707 may be sent to the client in at least some embodiments.

According to some embodiments, a client 701 may inform the AMRS 791 regarding the target data structures for which memory accesses are to be tracked, e.g., in the form of one or more TargetDataStructuresInfo messages 710. The granularity and specificity of the information provided regarding the target data structures may vary in different embodiments. In some embodiments, the client may provide the names (e.g., the fully qualified names in scenarios in which Java™ or a similar language is being used, indicating the package hierarchy) of specific data structures to be monitored. In other embodiments, a client may indicate one or more properties of targeted data structures, such as a string which may be part of the data structures' names, and the AMRS may analyze the applications (indicated for example in the monitored environment information provided via messages 705) to discover one or more specific data structures to be monitored. For example, the client 701 may indicate strings such as "credit," "loan," or "bank," and the AMRS may search for data structures and/or methods/functions whose names include the specified strings. In one embodiment, a client may use a TargetDataStructuresInfo message 710 to indicate that all data structure accesses are to be tracked, e.g., in scenarios in which the AMRS is to collect information about iterative and potentially redundant accesses to any data structure as discussed in the context of FIG. 4. The AMRS may transmit a TDSInfoSaved message 712 to the client in some embodiments, indicating that the provided information regarding to-be-monitored data structures has been saved.

In some embodiments, a client 701 may submit a ConfigureAgents message 720 to a client, indicating that memory access tracking agents (MATAs) similar to those discussed earlier should be deployed at various sources of anticipated access requests to the target data structures. In some cases, the client 701 may indicate specific hosts or servers at which the MATAs are to be configured, while in other cases the AMRS may analyze the information about the monitored environment to automatically detect specific hosts or servers at which the MATAs should be deployed. In at least one embodiment, network configuration or message flow patterns among the computing devices of the monitored environment may be captured and analyzed at the AMRS to detect candidate servers or hosts at which MATAs are to be deployed. In at least one embodiment, a client 701 may indicate specific run-time environments (such as JREs) and/or class path environment variable settings which can be used to deploy the MATAs. In one embodiment, a client may also indicate, e.g., via one or more parameters of the ConfigureAgents request 720, whether the MATAs are to run in "always-on" mode (e.g., whether, as soon as a MATA is brought up, it is to begin monitoring accesses), or whether additional commands from the client will be used to start and/or stop memory access monitoring.

In some embodiments, StartMonitoring messages 724 may be submitted to cause the MATAs to begin tracking access requests directed to the target data structures in a monitored environment specified via a request parameter, or at one or more specified hosts or servers specified via request parameters of a StartMonitoring message. The AMRS may send corresponding MonitoringStarted messages 726 to indicate that the MATAs have been notified to being monitoring. In at least one embodiment, StopMonitoring messages, not shown in FIG. 7, may be used to pause or terminate memory access monitoring if desired.

The raw context information collected by the MATAs may be quite detailed in some cases—e.g., a thread stack may include dozens or hundreds of methods or functions, many of which may not necessarily be of interest to a client 701. Similarly, depending on the complexity of the data structure being accessed, values of numerous elements or fields of the data structure may be captured in the raw context information in some cases, and only a subset of the elements may be of interest to the client. Accordingly, in at least some embodiments, the AMRS 791 may support client-directed filtering or customization of the context information. For example, a SetContextFilterDescriptor request 728 may be submitted, comprising a descriptor of the specific kinds of context information which the client wishes to receive with respect to accesses directed to one or more target data structures in the depicted embodiment. In some cases, a filter descriptor may specify the kinds of context information which the client does not want to obtain, instead of or in addition to specifying desired types of information. For example, a client may provide a filter descriptor which indicates the equivalent of: "Provide only the stack entries which represent methods in packages P1 or P2, and provide only values of fields F1 and F2 of the target data structure at the time of the access". The requested filter descriptor may be stored at the AMRS, and a FilterDescriptorSaved message 730 may be sent in acknowledgement in some embodiments.

According to one embodiment, a client 701 may submit one or more GetAccessRecords requests 732 to view the records collected by the MATAs; if the client has submitted an applicable filter descriptor, the context information may be filtered based on the descriptor before being provided to the client in the form of one or more AccessInfo messages 734. As indicated earlier, the filtering may be performed at any of several types of components of the AMRS in different embodiments. For example, in in some cases raw context information may be passed by the MATAs to access records collectors, and stored at an access record repository without being filtered, and the presentation managers responsible for sending the information to the clients may perform the filtering; in other embodiments, either the record collectors or the MATAs may perform the filtering.

In some embodiments, the AMRS 791 may collect metrics pertaining to the accesses directed towards targeted data structures, e.g., indicating the respective numbers of accesses from various sources (e.g., different hosts or different virtual machines) during a time interval, the change in the rates of accesses as a function of time of day, and so on. A ShowAccumulatedAccessMetrics request may be set by a client to obtain such metrics in the depicted embodiment, and the requested metrics may be provided via one or more AccessMetrics messages 738. Other types of programmatic interactions, not shown in FIG. 7, may be supported by an AMRS in at least some embodiments. For example, in one embodiment, a client may submit a request to an AMRS to analyze a monitored environment and provide a list of candidate access sources (e.g., identified by the AMRS based on network message flow analysis, analysis of application source code, or the like.)

Example Provider Network Environment

Figure 8:
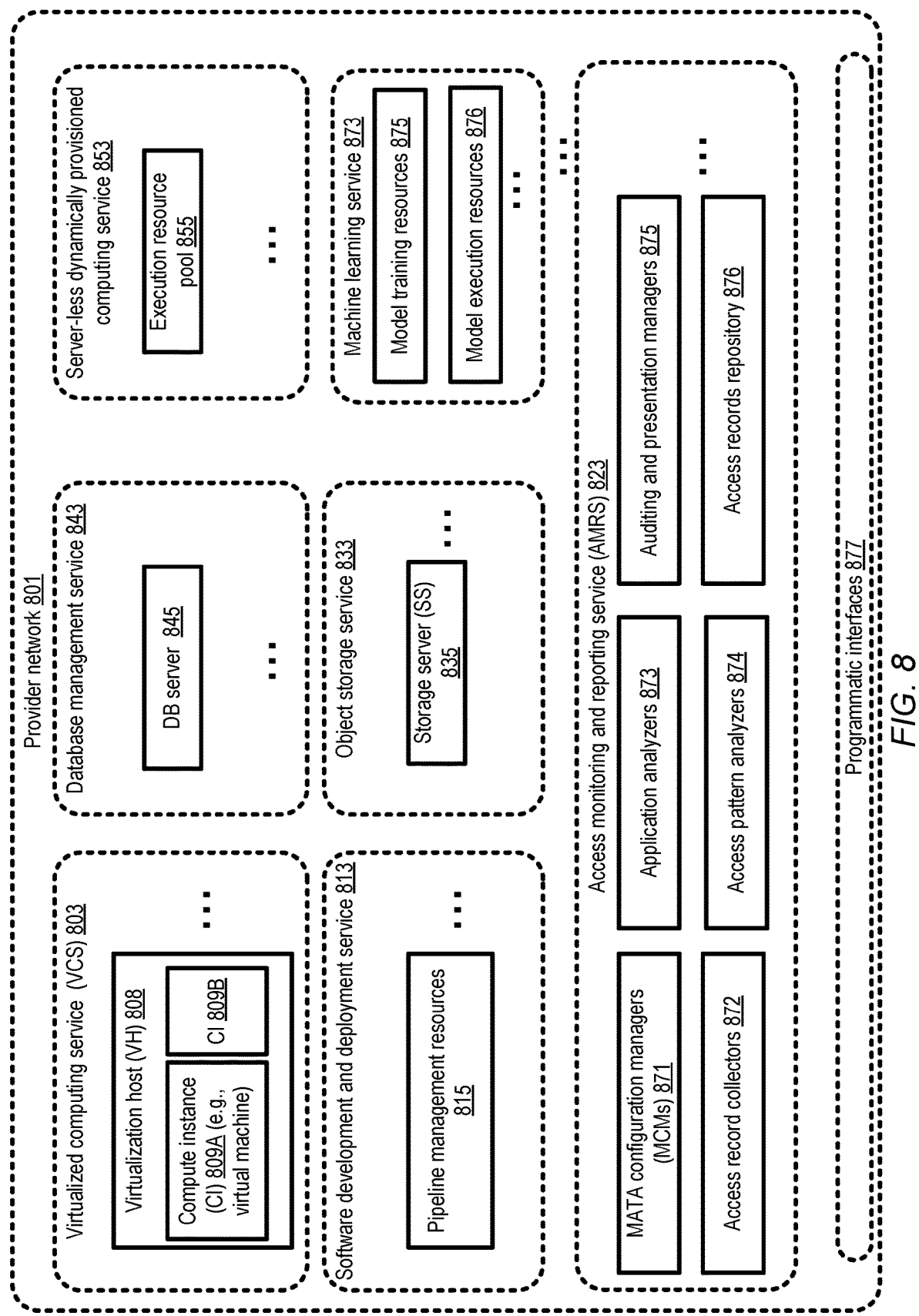
FIG. 8 illustrates an example provider network environment, according to at least some embodiments.

As mentioned earlier, in at least some embodiments, an access monitoring and reporting service (AMRS) similar to AMRS 110 of FIG. 1 may be implemented as part of a suite of services of a provider network or cloud computing environment. FIG. 8 illustrates an example provider network environment, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries. For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In the embodiment depicted in FIG. 8, provider network 801 includes a virtualized computing service 803, a database management service 843, a server-less dynamically provisioned computing service 853, a software development and deployment service 813, an object storage service 833, a machine learning service 873 as well as an AMRS 823. AMRS 823 may include components similar to those shown within AMRS 110 of FIG. 1, including for example MATA configuration managers 871, access record collectors 872, application analyzers 873, access pattern analyzers 874, auditing and presentation managers 875, as well as an access records repository 876.

Each of the services of provider network 801 may include a respective set of computing devices and/or other resources in some embodiments. Components of a given service may utilize components of other services in the depicted embodiment—e.g., compute instances (CIs) 809A or 809B (such as guest virtual machines) set up at the virtualization hosts 808 of the virtualized computing service 803 and/or storage servers 835 of an object storage service 833 may be employed by various other services of provider network 801 (including the AMRS) to implement their respective functions. Individual ones of the services shown in FIG. 8 may implement a respective set of programmatic interfaces 877 which can be used by external and/or internal clients (where the internal clients may comprise components of other services) in the depicted embodiment. Individual ones of the services shown in FIG. 8 may each provide high levels of automated scalability, availability, data durability, and failure resilience, enabling varying levels of workloads to be handled gracefully.

AMRS 823 may interact with or utilize other services of the provider network 801 in several different ways in the depicted embodiment. First, at least some components of the AMRS may utilize components of other services—e.g., computations for detecting access patterns, analyzing applications to identify target data structures and/or to identify sources of access requests and the like may comprise one or more compute instances 809, metadata and/or access records (including context information) may be stored at database servers 845 or storage servers 835, and so on. Secondly, the AMRS may monitor memory accesses of applications being run at other services, e.g., at the virtualized computing service 803, at the execution resource pool 855 of the server-less dynamically provisioned computing service, at the model training resources 875 or the model execution resources 876 of the machine learning service, and so on. Some of the applications whose data structures are to be monitored may be developed at the software development and deployment service 813, e.g., using development and testing pipelines managed using resources 815, and the AMRS may analyze versions of the applications at service 813 to detect target data structures and/or access request sources. In at least one embodiment, at least some of the techniques discussed above for efficiently monitoring and reporting on memory accesses may be implemented without acquiring resources of network-accessible services such as those shown in FIG. 8. For example, a standalone set of computing devices which are not part of a network-accessible service may be used in some embodiments.

Methods for Memory Access Tracking and Context Reporting

FIG. 9 is a flow diagram illustrating aspects of operations that may be performed to implement efficient detection and context-rich reporting of accesses to targeted data structures, according to at least some embodiments. As shown in element 901, indications of one or more target data structures (TDSs) for which accesses to in-memory representations are to be tracked at a computing environment may be obtained. In some embodiments, the list of data structures may be obtained (e.g., from a client) via one or more programmatic interfaces of an access monitoring and reporting service (AMRS) of a provider network, similar in features and functionality to AMRS 110 of FIG. 1. In other embodiments, the target data structures may be identified based on automated analysis of the applications. For example, an AMRS component may examine artifacts/metadata such as the source code and/or executable code of an application and identify target data structures based on their names (e.g., if a data structure's name contains the string "credit", "card", "bank", etc., this may lead to the deduction that the data structure may store sensitive financial information and should therefore be protected) or based on the invocation units (methods, functions etc.) which access the data structures. In one embodiment, a set of data structures that are accessed via methods of a particular package may be designated as target data structures, e.g., based on analysis of the package name. In one embodiment, an AMRS client may indicate the name of an SDK (software development kit) used to access potentially sensitive data, and the AMRS may generate a list of target data structures accessed via the SDK.

In some embodiments, the computing environment at which memory accesses to the target data structures are to be monitored may comprise resources a number of different network-accessible services which collectively process transaction requests submitted to one or more web sites; such resources may be distributed across multiple machines. A set of sources (e.g., physical and/or virtual machines) of access requests to the target data structures may be identified in various embodiments (element 904). In some cases, clients of an AMRS may indicate the sources via programmatic interfaces; in other cases, the AMRS may automatically detect at least some of the sources, based for example on analysis of network messages flow patterns in the ton-be-monitored computing environment. Note that in some embodiments, accesses may originate from programs that are running within virtual machines (such as JVMs or the like), which are themselves launched within operating systems of compute instances (e.g., guest virtual machines) running on physical host configured as a virtualization host of a computing service; as such, multiple levels of virtualization may be used for at least some of the applications whose accesses are to be monitored.

A respective memory access tracking agent (MATA) may be configured or deployed at various access sources in the depicted embodiment (element 907). A number of different techniques may be employed to configure MATAs in different embodiments; for example, in some embodiments, the deployment of a MATA may simply involve placing a JAR file or the like within a directory included in a class path environment variable setting. In other embodiments, at least some MATAs may be installed using an operating system's package manager tools and the like. As part of the deployment of a MATA, in at least some embodiments one or more configuration files (specifying the target data structures and/or details regarding how information about memory accesses is to be reported to other AMRS components) may also be transferred to the access sources. In one embodiment, a single MATA may be configured to monitor accesses originating at several different sources, or multiple MATAs may be configured for a single access source—that is, the mappings between MATAs and access sources may not necessarily be 1:1 in such embodiments.

In some embodiments, a MATA may start monitoring memory accesses as soon as it is brought online (e.g., as soon as a JVM at which the MATA is configured starts up, if it has not already been started up before the MATA was deployed). In other embodiments, a MATA may wait for a signal or message from other AMRS components before the MATA starts collecting data regarding memory accesses. In at least some embodiments, MATAs may detect access requests as well as associated raw context information (element 910). The context information may include, for example, thread stacks, content of a target data structure at the time of the access, and/or other data in various embodiments.

Optionally, in some embodiments, the raw context information may be filtered/transformed (element 913) to make it more presentable and easy to analyze. In one embodiment, a client may submit a filter descriptor to the AMRS programmatically, indicating the kinds of context information of interest to the client, or the kinds of context information which is likely to be most useful to one or more downstream programs (such as cache pre-loaders or code refactoring/restructuring tools) which may utilize the context information. Indications of the occurrences of access requests and associated context information may be provided to one or more destinations (such as a client, or a program which may initiate actions such as cache pre-loading or application code re-factoring procedures) programmatically in various embodiments (element 916).

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of configuring low-overhead agents for monitoring accesses to regions of memory containing targeted data structures which may contain sensitive data, and for using the information collected by the agents for taking actions such as auditing for regulatory compliance or enhancing overall application performance may be beneficial in a variety of scenarios. Attackers are constantly devising more and more sophisticated techniques to breach computer system security. Especially in complex service environments (such as multi-service suites handling transactions of an e-retail web site) in which the same data may be accessed from numerous distributed subcomponents, the ability to obtain complete information about all the accesses to target data structures may be very helpful in meeting privacy and security requirements. Furthermore, providing information regarding frequent accesses may be helpful in pre-loading caches at some applications, and for eliminating redundant accesses, both of which may help to improve overall application performance.

Illustrative Computer System

Figure 10:
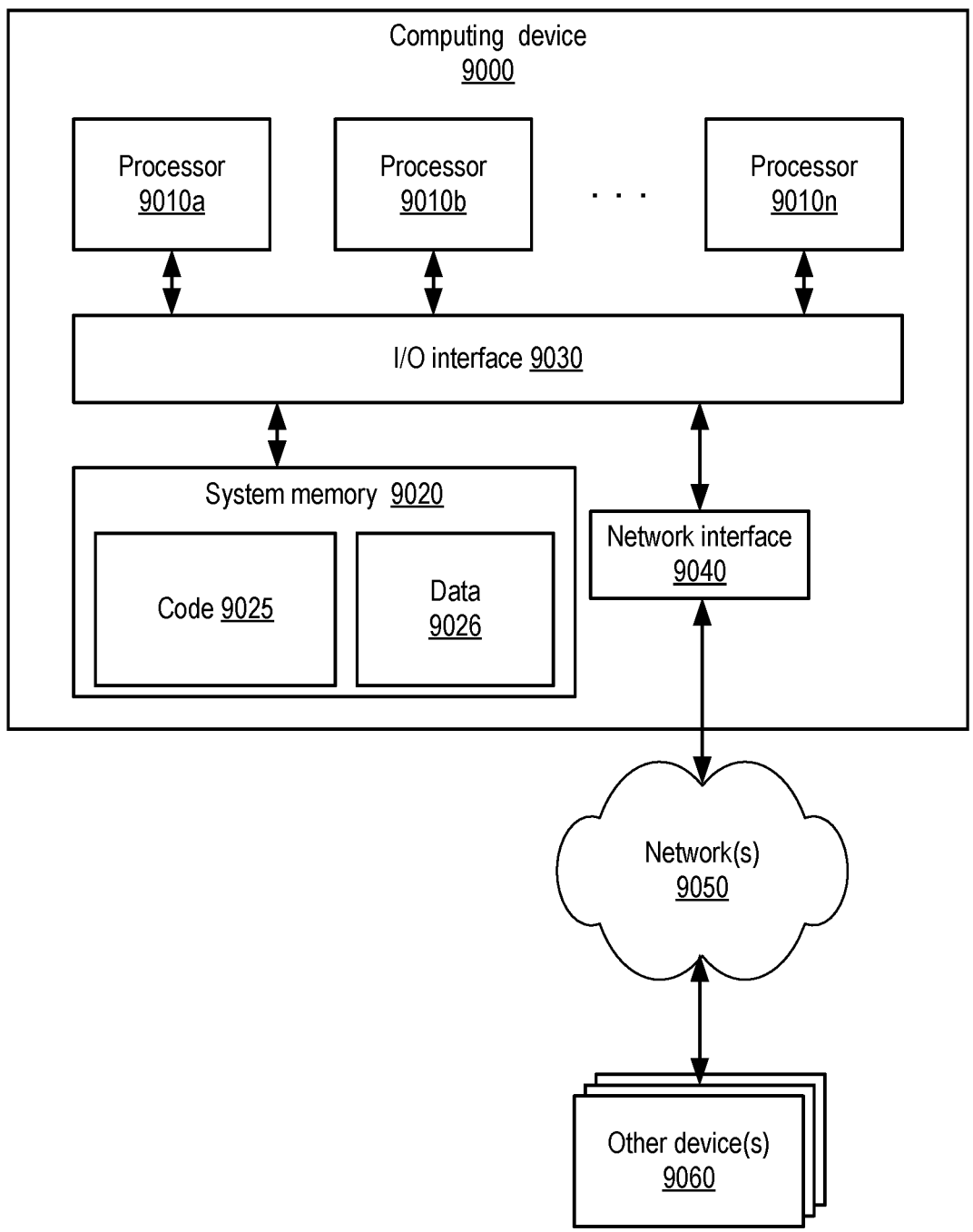
FIG. 10 is a block diagram illustrating an example computing device that may be used in at least some embodiments.

In at least some embodiments, a server at which memory monitoring techniques of the kind described herein are implemented, such as memory access tracking agents as well as the components of the access monitoring and reporting service and/or other services of a provider network, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030, and a hardware memory monitor 9091 similar in features and functionality to memory monitor 120 of FIG. 1.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026. Code 9025 may include, for example, instructions usable to set configuration settings for memory monitoring, populating the sensitive region registers accessed by the memory monitor 9091, and so on. A subset of data 9026 may similarly pertain to aspects of memory monitoring.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices comprise executable instructions that when executed on or across one or more processors cause the one or more computing devices to implement an access monitoring and reporting service (AMRS), wherein the AMRS is configured to:
  obtain an indication of one or more target data structures classified as sensitive data structures comprising sensitive data associated with an application, for which access to corresponding in-memory representations of the indicated target data structures is to be tracked, wherein the classification is based at least in part on respective data structure names or other identifiers indicated in respective source code or executable code associated with the target data structures;
  identify a plurality of sources from which access requests to the corresponding in-memory representations of the indicated target data structures comprising the sensitive data originate, including one or more hosts;
  cause a respective memory access tracking agent to be configured at individual ones of the identified plurality of sources requesting the access to the in-memory representations of the indicated one or more target data structures that comprise the sensitive data, wherein the respective memory access tracking agent comprises dynamically injected executable code injected into one or more programs associated with the application;
  detect, at a first memory access tracking agent of the respective memory tracking agents, an access request directed to a particular in-memory representation of a first target data structure of the indicated one or more target data structures, wherein the access request originates at a program running within a virtual machine at a first host of the identified one or more hosts, and wherein source code of the program is not modified to enable the detection of the access request to the particular in-memory representation of the first target data structure, wherein the access request is detected at least in part using the dynamically injected executable code;
  obtain, by the first memory access tracking agent, raw run-time context information pertaining to the access request, wherein the run-time context information comprises at least a thread stack;
  generate a modified version of the obtained raw run-time context information in accordance with one or more filtering criteria obtained via a programmatic interface; and
  cause respective indications of (a) the occurrence of the access request and (b) the modified version of the obtained raw run-time context information to be provided to one or more destinations.

2. The system as recited in claim 1, wherein the run-time context information includes a value stored in the first target data structure.

3. The system as recited in claim 1, wherein to cause the respective memory tracking agent to be configured, the one or more computing devices comprise further executable instructions that, when executed on or across the one or more processors, further cause the one or more computing devices to:
store a file containing byte code in a location indicated by a class path configuration setting.

4. The system as recited in claim 1, wherein at least one of the target data structures is a class that implements a portion of the application, and classification of the class as a sensitive data structure is based at least in part on one or more of a class name, a property name, a method name, a function name, or a procedure name of the class.

5. The system as recited in claim 1, wherein the one or more computing devices comprise further executable instructions that when executed on or across one the or more processors further cause the one or more computing devices to:
cause to be presented, via one or more programmatic interfaces, one or more metrics pertaining to memory accesses directed to the one or more target data structures.

6. A method, comprising:
performing, at one or more computing devices:
causing a respective memory access tracking agent to be configured at individual ones of one or more sources to track access requests originating from the individual sources directed to a set of target data structures classified as sensitive data structures comprising sensitive data associated with an application, wherein the classification is based at least in part on respective data structure names or other identifiers indicated in respective source code or executable code associated with the target data structures, wherein the respective memory access tracking agent comprises dynamically injected executable code injected into one or more programs associated with the application;
detecting, at a first memory access tracking agent of the respective memory tracking agents, an access request directed to a particular in-memory representation of a first target data structure of the set of indicated target data structures comprising the sensitive data, wherein the access request is detected at least in part using the dynamically injected executable code;
determining, by the first memory access tracking agent, run-time context information pertaining to the access request, wherein the run-time context information comprises at least a portion of a thread stack; and
causing respective indications of (a) the occurrence of the access request and (b) at least a portion of the obtained run-time context information to be provided to one or more destinations, wherein the portion of the obtained context information is transformed in accordance with a transformation descriptor obtained via a programmatic interface.

7. The method as recited in claim 6, wherein the context information includes a value stored in the first target data structure.

8. The method as recited in claim 6, wherein the transformation descriptor indicates one or more entities in the context information.

9. The method as recited in claim 6, wherein causing a particular memory tracking agent to be configured includes storing a file containing byte code in a location indicated by a class path configuration setting.

10. The method as recited in claim 6, further comprising performing, at the one or more computing devices:
examining metadata of the application; and
identifying one or more candidate target data structures for access monitoring based on said examining, wherein the one or more candidate target data structures include the first target data structure.

11. The method as recited in claim 6, further comprising performing, at the one or more computing devices:
causing to be presented, via one or more programmatic interfaces, one or more metrics pertaining to memory accesses directed to the set of target data structures.

12. The method as recited in claim 6, further comprising performing, at the one or more computing devices:
causing to be presented, via one or more programmatic interfaces, an indication of potential redundant accesses to the first target data structure from one or more sources of access requests.

13. The method as recited in claim 6, wherein the first memory access request is generated from a program written in a system-agnostic programming language, and wherein a system-specific application programming interface is used to obtain the context information.

14. The method as recited in claim 6, wherein detecting the access request comprises utilizing an access notification interface provided by a run-time environment in which the application is executed.

15. The method as recited in claim 6, wherein the respective memory access tracking agent comprises dynamically injected executable code injected without altering a source code of the application.

16. One or more non-transitory computer-accessible storage media storing program instructions that when executed on or across one or more processors cause one or more computer systems to:
detect, at a first memory access tracking agent configured at a source of access requests directed to a set of target data structures classified as sensitive data structures comprising sensitive data associated with an application, an access request directed to a particular in-memory representation of a first one of the set of target data structures comprising the sensitive data, wherein the classification is based at least in part on respective data structure names or other identifiers indicated in respective source code or executable code associated with the target data structures, wherein the first memory access tracking agent comprises dynamically injected executable code injected into one or more programs associated with the application, and the access request is detected at least in part using the dynamically injected executable code;
obtain, by the first memory access tracking agent, run-time context information pertaining to the access request, wherein the run-time context information comprises at least a portion of a thread stack; and
cause respective indications of (a) the occurrence of the access request and (b) at least a portion of the obtained run-time context information to be provided to one or more destinations, wherein the portion of the obtained context information is filtered in accordance with one or more filtering criteria obtained via the programmatic interface.

17. The one or more non-transitory computer-accessible storage media as recited in claim 16,
wherein the filtering is applied to one or more entities of interest in the portion of the obtained context information indicated by a filtering descriptor obtained via the programmatic interface.

18. The one or more non-transitory computer-accessible storage media as recited in claim 16, storing further program instructions that when executed on or across the one or more processors further cause one or more computer systems to:
obtain, via one or more programmatic interfaces, an indication of one or more properties of target data structures; and
identify the set of target data structures based at least in part on the indication of the one or more properties.

19. The one or more non-transitory computer-accessible storage media as recited in claim 16, wherein the programmatic interface is a programmatic interface of a network-accessible service of a provider network, wherein the detection of the access request is responsive to a memory access monitoring request.

20. The one or more non-transitory computer-accessible storage media as recited in claim 16, storing further program instructions that when executed on or across the one or more processors further cause one or more computer systems to:
analyze a network message flow pattern to identify at least one source of access requests to the set of target data structures.

* * * * *